United States Patent [19]
Stone

[11] Patent Number: 5,887,462
[45] Date of Patent: Mar. 30, 1999

[54] METHOD AND APPARATUS FOR CHOCKING AND LOCKING A VEHICULAR WHEEL

[76] Inventor: Wayne B. Stone, 8825 W. Farm Rd. 52, Walnut Grove, Mo. 65770

[21] Appl. No.: 577,936

[22] Filed: Dec. 22, 1995

[51] Int. Cl.⁶ .................................................. B62H 5/16
[52] U.S. Cl. .................................. 70/19; 70/226; 70/237; 188/36
[58] Field of Search .............................. 70/19, 225, 226, 70/14, 18, 237, 228; 188/32, 36; 180/287

[56] References Cited

U.S. PATENT DOCUMENTS

| | | | |
|---|---|---|---|
| Re. 24,712 | 10/1959 | Marugg | 70/225 |
| 1,139,988 | 5/1915 | McMillan et al. | 188/32 |
| 2,960,857 | 11/1960 | Winter | 70/225 |
| 3,828,590 | 8/1974 | Thiebault | 70/225 X |
| 4,031,983 | 6/1977 | Lentini | 188/32 |
| 4,159,731 | 7/1979 | Dyrdahl | 152/228 |
| 4,164,131 | 8/1979 | Desmond et al. | 70/19 X |
| 4,441,586 | 4/1984 | Bernier | 70/225 X |
| 4,768,359 | 9/1988 | Wade . | |
| 4,833,442 | 5/1989 | Von Heck . | |
| 5,040,389 | 8/1991 | Beaudoin | 70/226 |
| 5,134,868 | 8/1992 | Bethards . | |
| 5,247,815 | 9/1993 | Caldwell | 70/18 X |
| 5,372,018 | 12/1994 | Smith . | |
| 5,460,021 | 10/1995 | Taylor | 70/226 X |

FOREIGN PATENT DOCUMENTS

| | | | |
|---|---|---|---|
| 992345 | 5/1987 | Canada | 70/252 |
| 2567215 | 1/1986 | France | 70/252 |
| 2589805 | 5/1987 | France | 70/252 |
| WO86/05150 | 9/1986 | WIPO . | |

*Primary Examiner*—Lloyd A. Gall

[57] ABSTRACT

A force multiplier is employed to embed a compression element or elements of a vehicular chock assembly in one or both sidewalls of a tire to effect a positive interlock therewith. The force multiplier is then locked to the chock assembly to maintain the interlock.

9 Claims, 5 Drawing Sheets

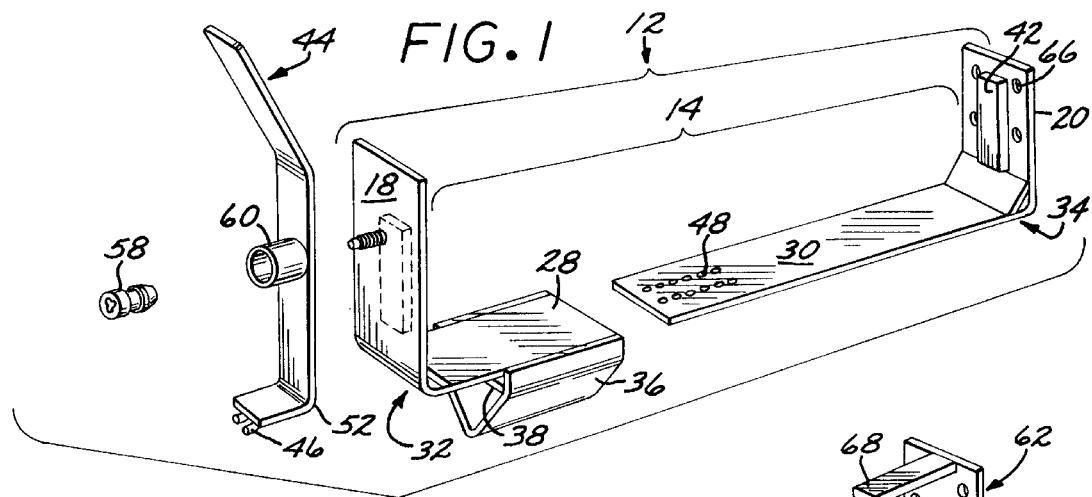
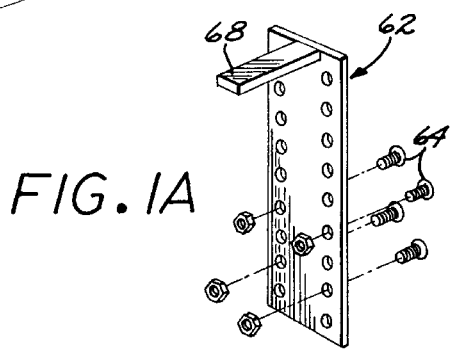
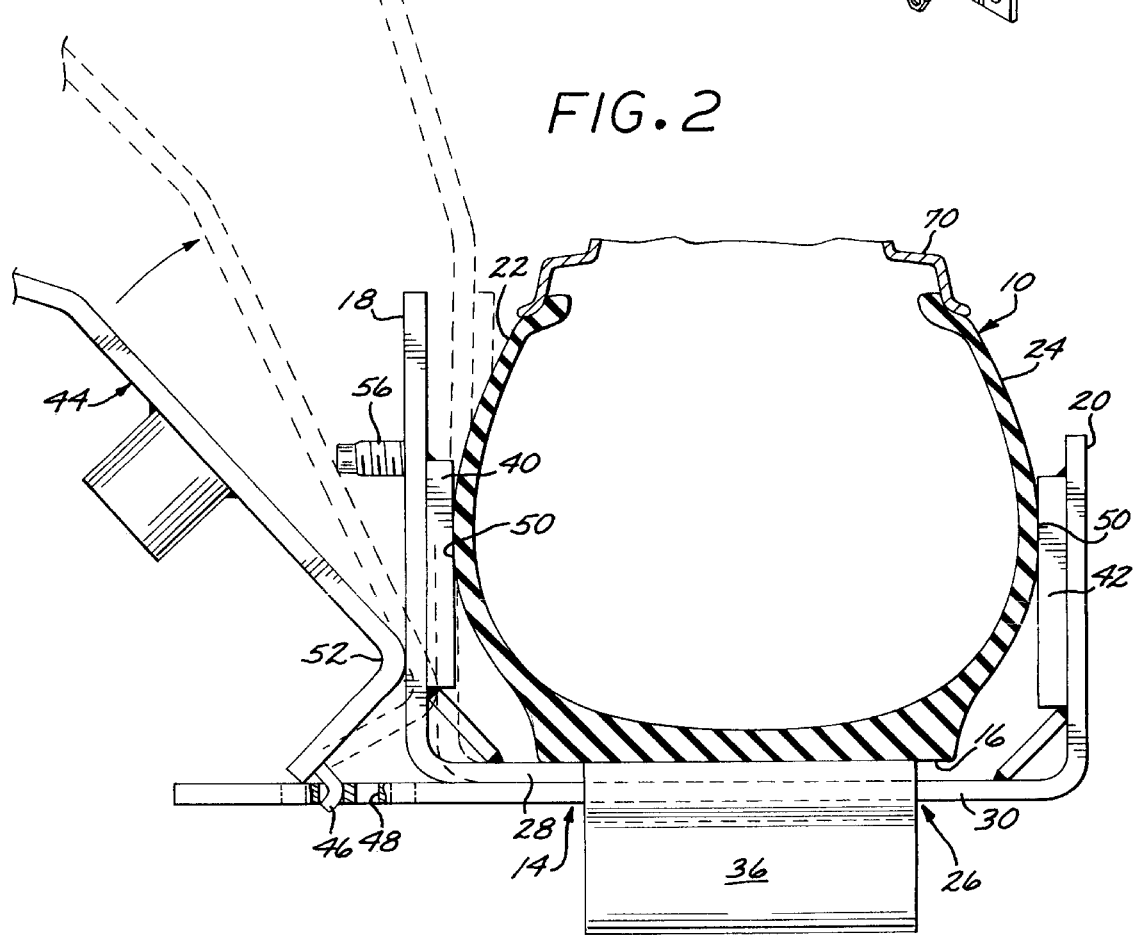

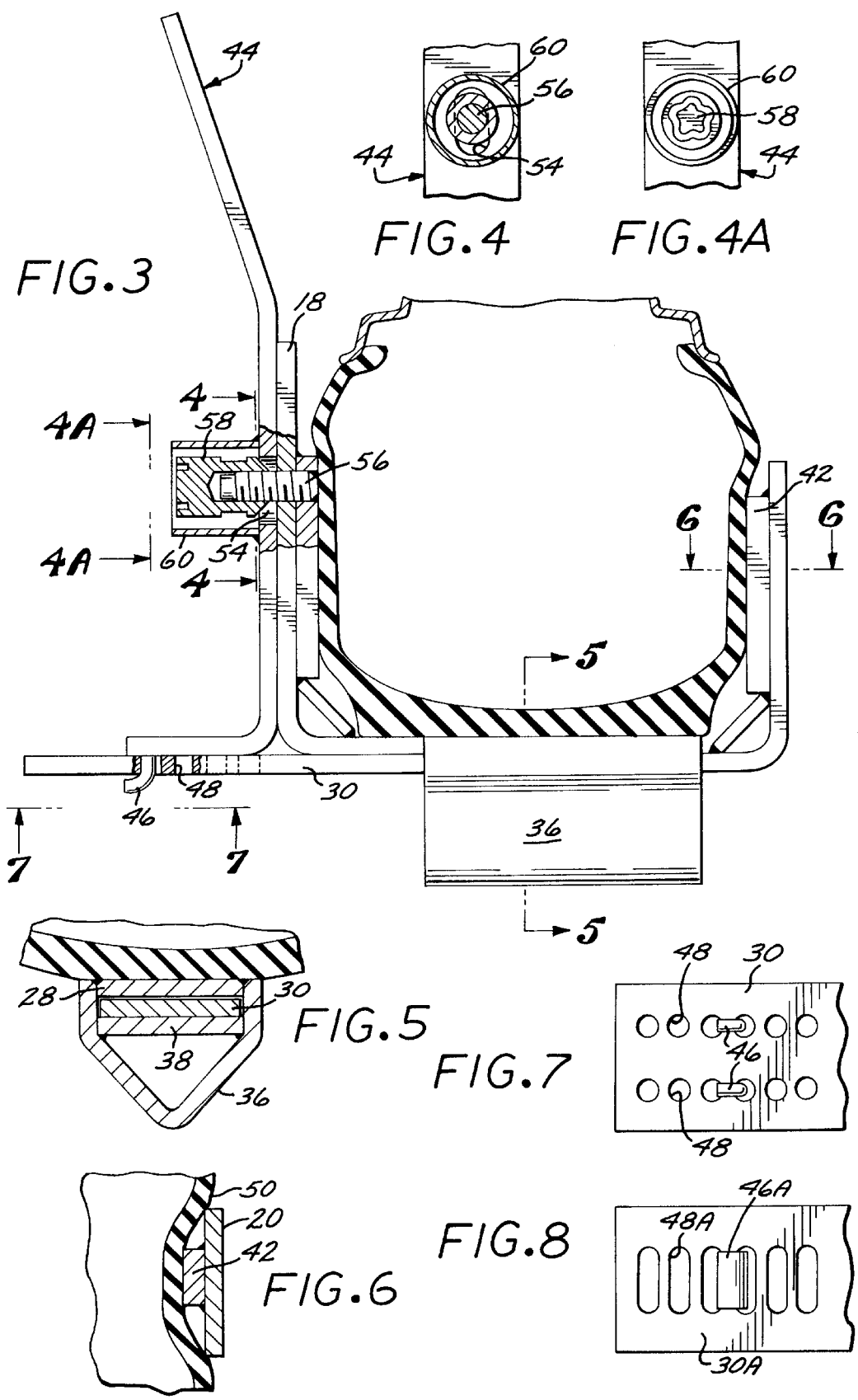

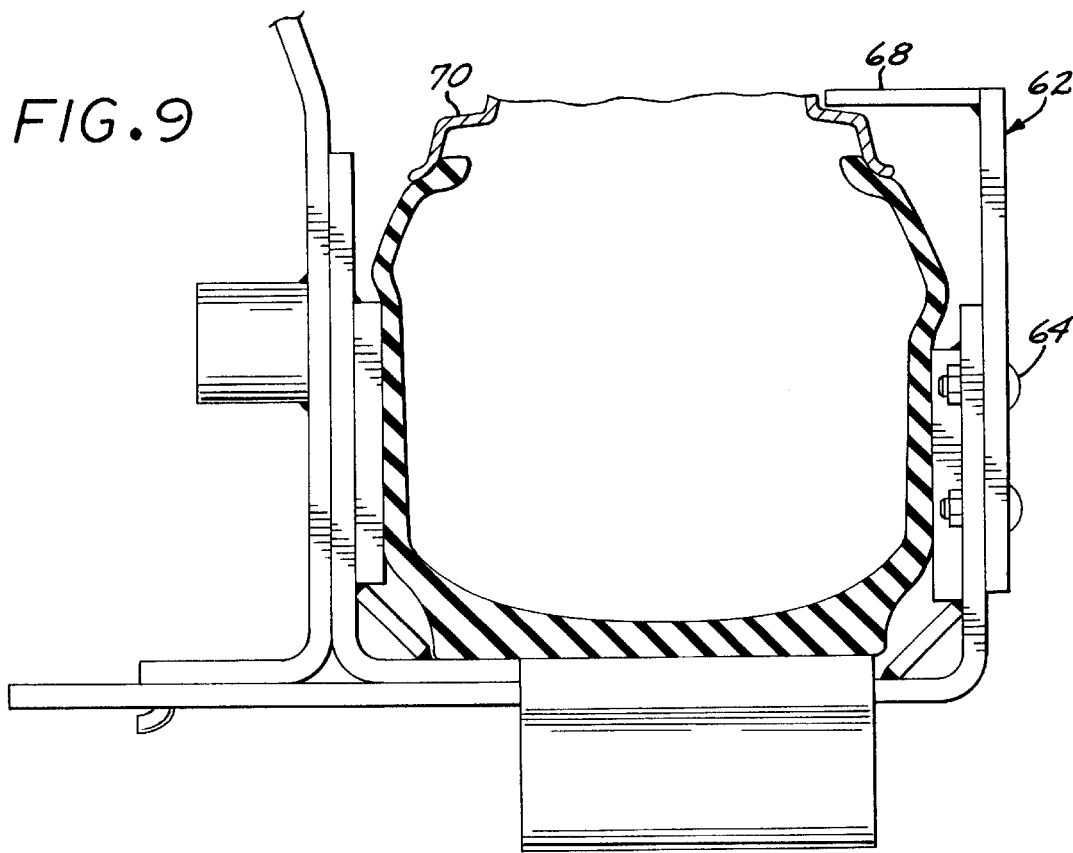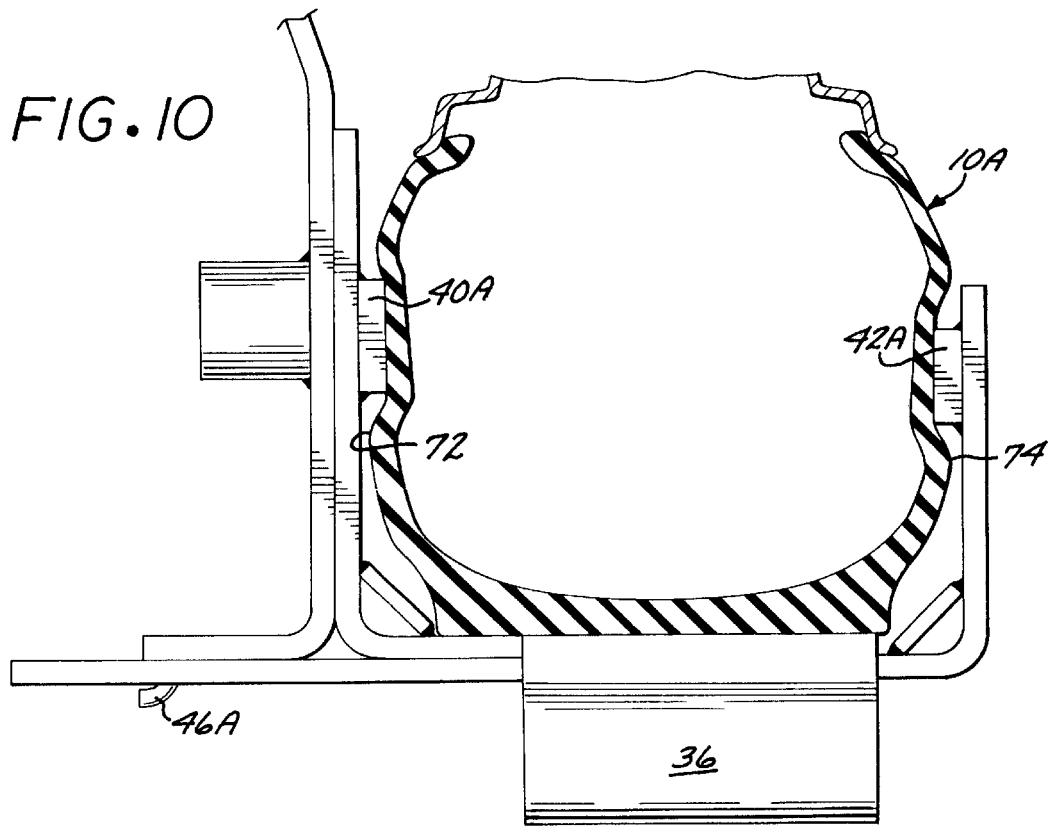

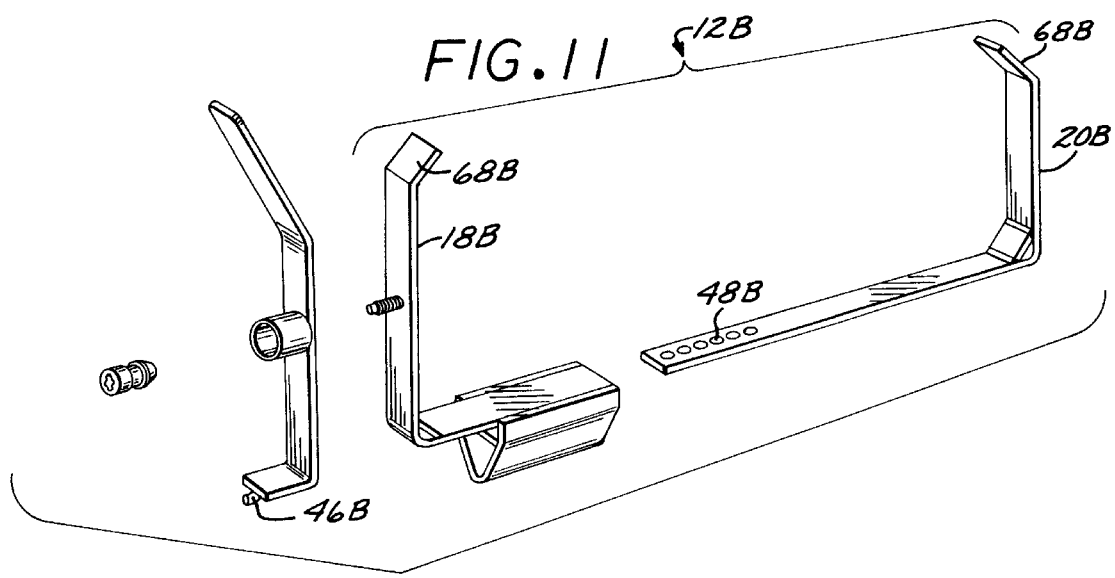
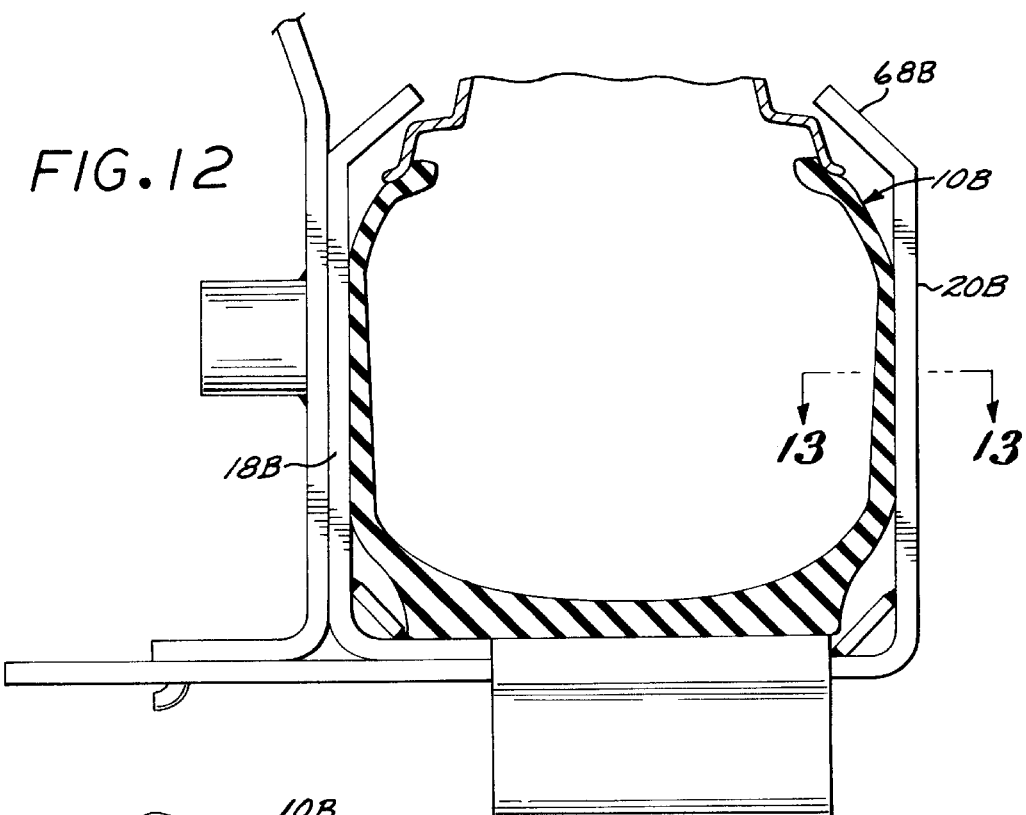
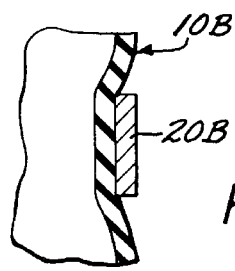

METHOD AND APPARATUS FOR CHOCKING AND LOCKING A VEHICULAR WHEEL

BACKGROUND OF THE INVENTION

1. Field of the Invention

The invention relates to vehicular wheel chock clamps for rim mounted pneumatic tires and, more specifically, to a clamp that may be readily interlocked with a tire, per se, to prevent rotation of an inflated tire relative to the clamp. This is effected by a controlled compression of a discrete area or areas in one or both tire sidewalls to the extent that the compressing element or elements may be fully embedded in the tire to, in effect, act as a fixed rack tooth with respect to the uncompressed tire wall areas on either side thereof which uncompressed side wall areas act, in effect, as adjacent pinion teeth.

The necessary tire wall compression to interlock a clamp and tire, as described above, may be determined empirically. For example, a loaded boat trailer of approximately 2,500 pounds gross weight with a cold tire inflation pressure of 50 P.S.I. was fitted with a wheel chock clamp, of the type herein disclosed, sized to impinge the trailer undercarriage upon forced rotation of the wheel and chock clamp. A single compressing element 1" wide and ⅜" thick fully embedded (i.e. ⅜") into one of the tire sidewalls effected a positive interlock with the tire. Thus when the wheel was initially chocked against forward motion and the trailer forcibly pulled forward, the wheel and interlocked chock clamp rotated as a unit for approximately 120 degrees as the chock was rolled over and came into abutting engagement with the trailer undercarriage at which time the interlocked tire skidded along the pavement as forced towing was continued.

2. Prior Art Statement

There are prior art wheel chock clamps that interlock with a wheel rim, as opposed to the tire, to preclude rotation of the wheel relative to the clamp as by a clamp extension passing laterally through an opening in the rim itself, as for example, in U.S. Pat. No. 4,833,442. The disadvantage in this type wheel interlock is that virtually all wheel rims are different, many do not have suitable lateral openings and others employ hub caps that cover whatever openings there may be. The prior art has generally recognized the practical shortcomings of this type interlock and has opted for telescoping chock clamps, laterally adjustable to accommodate various rim/tire widths, with lateral extensions that overlie the rim thus precluding removal of the clamp radially of the tire. Exemplary are U.S. Pat. Nos. 4,768,359; 5,134,868; 5,372,018 and International Publication Number WO 86/05150. While the latter mentioned exemplars may indeed preclude removal of the chock clamps they offer little resistance to a thief intent upon stealing a vehicle with the clamp still in place. This is so because the "locked" wheels can rotate relative to, and within the locked confines of, the wheel clamp.

U.S. Pat. No. 5,372,018, although bearing a superficial resemblance to the present invention, does not prevent theft of the trailer since the "lock" disclosed therein is not, and cannot be, rotationally interlocked with the wheel or any part thereof. Thus a thief simply tows the trailer forwardly over the "lock" which is then dragged behind the wheel as the wheel rotates relative to the trailing "lock". The same is true for the "lock" disclosed in IPN WO 86/05150.

Similarly, a locking device such as shown in U.S. Pat. 5,134,868 which "firmly" engages opposite sides of a solid, smooth surfaced wheel rim (column 3, lines 10–12 and lines 21–23) via a pair of blunt ended metal jaws is nothing more than that "finger tight" engagement with the rim as may be effected by an output force equal only to the input force (1:1) of the individual applying the lock. The blunt metal to metal engagement of the jaws and solid, smooth rim as may be effected by a 1:1 force application could obviously not resist even manual rotation of the locking device relative to the wheel through the mechanically advantaged intermediary of the extended chock legs. Even more obvious is the fact that said "firm" engagement will yield upon impingement of the chock with a vehicle undercarriage.

More specifically if the locking device of U.S. Pat. No. 5,134,868 is positioned to chock rearward movement of the vehicle then as the vehicle is moved forwardly the "finger tight" engagement may or may not be sufficiently tight to lift the weight of the lock but if it is, as soon as the chocking elements impinge the vehicle undercarriage, the "finger tight" engagement will yield and the vehicle tire will rotate relative thereto as the vehicle is moved forwardly. If the locking device is positioned to chock forward movement, a thief need only jack up the vehicle and rotate the wheel until the lock is in a trailing position with the same result as described above. If a thief does not have a jack to rotate the wheel until the lock is in a trailing position, he need only pull or pry the extended chock legs upwardly until they are parallel to the ground, or he can move the vehicle rearwardly a few inches until the chock legs are similarly raised at which time a line is looped around the ratchet bar and secured to a convenient undercarriage element after which the vehicle may be moved forwardly with the chock legs well clear of the ground and the rim clamping jaws sliding readily along the rim.

In the case of U.S. Pat. No. 4,768,359, a thief need only roll the vehicle rearwardly over the lock to position the same forwardly of the wheel and spaced above the ground, whereafter a straightened coat hanger or other line is passed through the lock shackle and secured to the front bumper or any convenient undercarriage element and the car may be driven off with the rim embracing bars sliding along the rim lip.

Clamp type locks employing teeth to penetrate the tire as in U.S. Pat. No. 5,247,815 disclose no tire compression and are otherwise undesirable in that the vehicle owner who forgets the clamp is in place will ruin his tire.

SUMMARY OF THE INVENTION

The concept of the invention is to interlock a chock assembly with any size vehicle tire by compressive engagement with one or both of the tire sidewalls through the intermediary of a force multiplier having, for example, a 5:1 mechanical advantage or greater whereby substantial compression can be effected. More specifically, use is made of a second class lever having a mechanical advantage sufficiently great for a person of average strength to deform a discrete area in the bulge of one or both tire sidewalls into straight line conformity with the compressing element or elements to positively interlock the chock assembly and tire, i.e. the compressing element is embedded in the tire wall after which time the force multiplier is locked to the chock assembly by a self locking lug nut to maintain the compressive engagement. In the test models built to date, a 7:1 mechanical advantage employing a one foot lever arm is preferred in that the lever may be comfortably held in the full tire compressing position by one hand while the other is applying a self-locking lug nut.

In addition to interlocking the chock assembly and tire against relative rotation, the aforesaid compressive engagement also resists radial withdrawal of the chock assembly unless the tire is deflated in which event the vehicle is disabled.

To prevent removal from even a deflated tire, the chock assembly may include at least one rim abutment portion adapted to overlie the wheel rim to prevent removal of the device by deflating the tire and/or jacking the vehicle to permit use of a force multiplier to force the chock assembly radially from the wheel.

In the case of those vehicles which do not employ hubcaps, such as boat trailers, rim abutment members may be used on both sides of the wheel. In the case of those wheels having hubcaps, a single rim abutment member may overlie the wheel rim on the side opposite the hubcap.

Typically, the tire bulge extends well beyond the lateral confines of the wheel rim. The compressive tire engagement is effected substantially at, slightly above, and/or below the maximum tire bulge area to insure integrity of the tire bead seal. Therefore, it will be seen that the compressive engagement referred to could be, for example, a one-half inch compression into one or both tire sidewalls to provide a positive interlock between the chock and wheel. Thus, if the compressively locked vehicle tire is forcibly drawn forward as in the case of a boat trailer, for example, the chock will be rolled over and engage the trailer undercarriage whereupon the tire will skid since it cannot rotate as opposed to the prior art clamps, previously mentioned, where the wheel can rotate relative to the chock either by undercarriage impingement or physical restraint, i.e. a securing line.

DESCRIPTION OF THE DRAWINGS

FIG. 1 is an exploded perspective of a telescoping chock assembly having two tire compression elements, a force multiplier and a self locking lug nut;

FIG. 1A is a perspective view of a rim abutment member that may be employed with the chock assembly of FIG. 1;

FIG. 2 is a front elevational view of the chock assembly of FIG. 1 telescoped together to engage the sidewalls of a sectioned tire with the solid line force multiplier in position to commence the compression thereof;

FIG. 3 shows the chock assembly of FIG. 2 fully compressed and the force multiplier locked thereto;

FIG. 4 is a view taken along line 4—4 of FIG. 3;

FIG. 4A is a view taken along line 4A—4A of FIG. 3 illustrating the lug nut locking pattern;

FIG. 5 is a cross sectional view taken along line 5—5 of FIG. 3;

FIG. 6 is a cross section taken along line 6—6 of FIG. 3;

FIG. 7 is a partial bottom plan viewed along line 7—7 of FIG. 3 illustrating the selective engagement position of the force multiplier;

FIG. 8 is a view similar to FIG. 7 illustrating an alternate force multiplier engaging means;

FIG. 9 shows the embodiment of FIG. 3 with the rim abutment of FIG. 1A attached;

FIG. 10 is a view identical to FIG. 3 except that the compression elements are longitudinally abbreviated to terminate at and just above the maximum tire bulge line;

FIG. 11 is a view similar to FIG. 1 of a modified chock assembly and locking mechanism;

FIG. 12 shows the chock assembly of FIG. 11 in tire compressing position and the force multiplier locked thereto;

FIG. 13 is a section along line 13—13 of FIG. 12;

DESCRIPTION OF THE PREFERRED EMBODIMENTS

Figure 14:
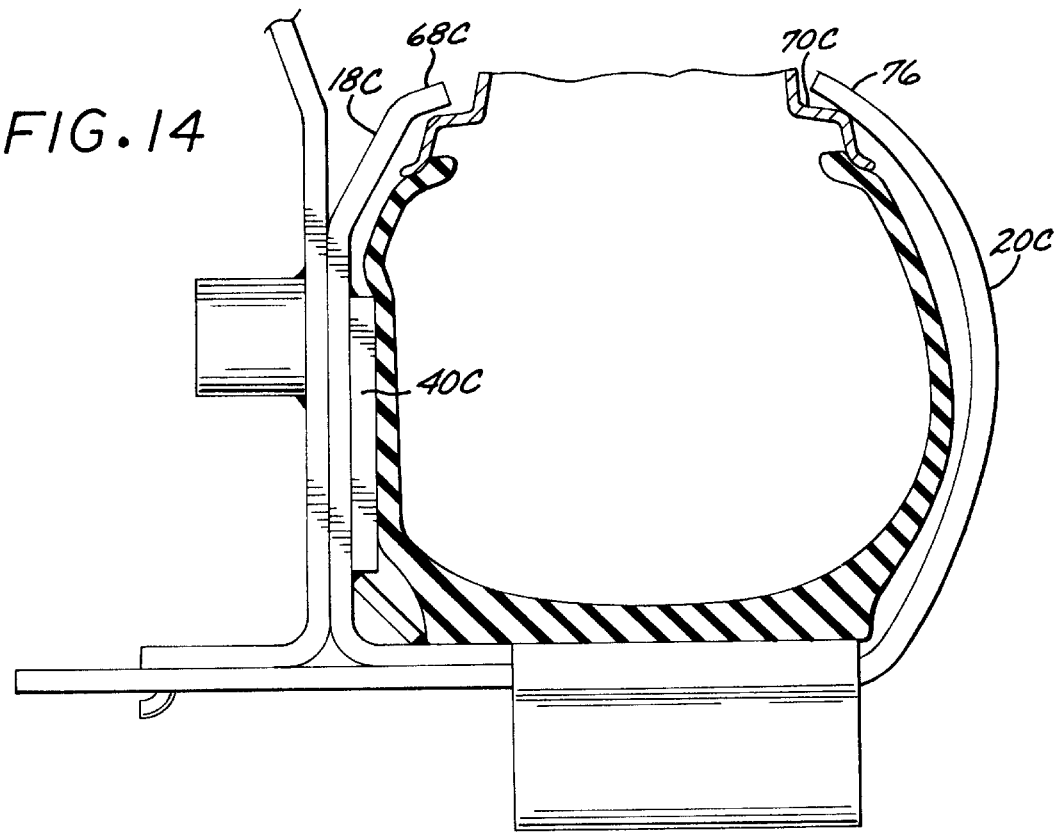
FIG. 14 is a view, similar to FIG. 3, of a further modified chock assembly specifically adapted for boat trailers.

FIGS. 1–3 depict successive steps in compressive chocking engagement of a rim mounted vehicle tire 10 by a generally U-shaped chock assembly 12 whose bight portion 14 spans tire tread 16 and whose upstanding arms 18,20 may be manually positioned adjacent to, and embracing, tire sidewalls 22, 24 (as in FIG. 2) via a telescopic interconnection 26 of horizontal legs 28, 30 of generally L-shaped members 32, 34 comprising chock assembly 12. Chock element 36 is integral with leg 28 and a plate 38 spaced therefrom for the telescopic receipt of leg 30.

Either or both arms 18, 20 may include, on the facing surfaces thereof, an integral tire compression element 40, 42 of lesser width than arms 18, 20 to reduce the force necessary to effect compressive engagement of a respective sidewall 22, 24.

A force multiplier, such as a generally L-shaped lever 44, includes fulcral engaging means 46 engagable with a selected pair of multiple fulcra holes 48 in horizontal leg 30 as best shown in FIG. 2.

With U-shaped chock assembly 12 in partial telescopic engagement the bight portion 14 thereof is placed against tire tread 16. Arms 18 and 20 are pressed toward each other via telescopic interconnection 26 until compression bars 40, 42 firmly engage bulge 50 on either side of tire 10. In such tire engaging position multiple pairs of fulcra holes 48 in horizontal leg 30 extend beyond upstanding arm 18 as shown in FIG. 2. Fulcral engaging means 46, in the form of integral hooks on lever 44, are engaged with the appropriate pair of holes 48 to correspond with the tire width. This is the solid line position of FIG. 2 with the right angle bend 52 of lever 44 engaging arm 18 adjacent the lower end thereof, typically about one inch above horizontal leg 30. In the solid line position of FIG. 2 an approximate 7:1 mechanical advantage is available to commence tire compression which mechanical advantage increases rapidly as the lever is fulcrummed toward arm 18 and the pressure application area 52 moves downwardly as in the left— most dotted line position of FIG. 2. FIG. 3 illustrates full compression of tire wall bulge 50 such as when lever 24 is in the right -most dotted line position of FIG. 2. With lever 44 in the fully locked position of FIG. 3, compression bars 40, 42 are fully embedded in tire wall bulge 50 as shown in FIG. 6.

Lever 44 is slotted at 54 (see FIGS. 3 and 4) to receive threaded stud 56 which is integral with arm 18. With lever 44 held in the fully locked position of FIG. 3, a key operated, wheel locking lug nut 58 is screwed onto stud 56 within the confines of lock protecting sleeve 60 integral with lever 44, and surrounding slot 54. Lug nut 58 engages opposite sides of slot 54 and is flush with or just within the outer confines of sleeve 60 in the locked position. The particular wheel locking lug nut illustrated is manufactured by McGard, Inc., of Orchard Park, N.Y. 14127-4198 under the designation: "Narrow Groove Key Pattern".

Instead of the paired integral hooks 46 engaging paired fulcra 48, the compressing lever may employ a single, wide hook element 46A to engage selected, slotted fulcra 48A in leg 30A as in FIG. 8.

In order to preclude removal of the chock assembly from a deflated tire an adjustable rim abutment member 62 may be secured to arm 20 via stove bolts 64 and openings 66 in arm 20 to position rim abutment element 68 above rim lip 70 as shown in FIG. 9.

In order to preclude removal of the locked chock assembly from an inflated tire as by use of a force multiplier, for example, shortened compression elements 40A, 42A (FIG. 10) are employed to compress tire 10A just above and at the maximum tire bulge, respectively, so that the uncompressed tire portions 72, 74 therebelow resist movement radially of the tire. FIG. 10 illustrates less than full embedment of compression elements 40A, 42A as would result from prongs 46A having been engaged in the next right-most openings and is so illustrated to better show the "rack tooth" (40A, 42A) and "pinion" (72, 74) analogy resisting relative radial as well as rotational movement.

The embodiment of FIGS. 1–3 as constructed and tested was formed from quarter inch rolled steel using three eighth inch compression elements. The weight of the combined chock assembly and locking lever is just over ten pounds. That weight is substantially halved by using a more narrow stock of the same thickness which does not require separate compression elements since the narrower arms of the chock assembly may, themselves, be readily embedded in a tire.

Other than in size the embodiment of FIGS. 11–13 differs from that of FIGS. 1–3 in the absence of separate compression elements, relying instead on arms 18B, 20B of chock assembly 12B to compress tire 10B; integral rim abutment members 68B; and a single fulcral engaging prong 46B to selectively engage a single row of openings 48B.

Figure 15:
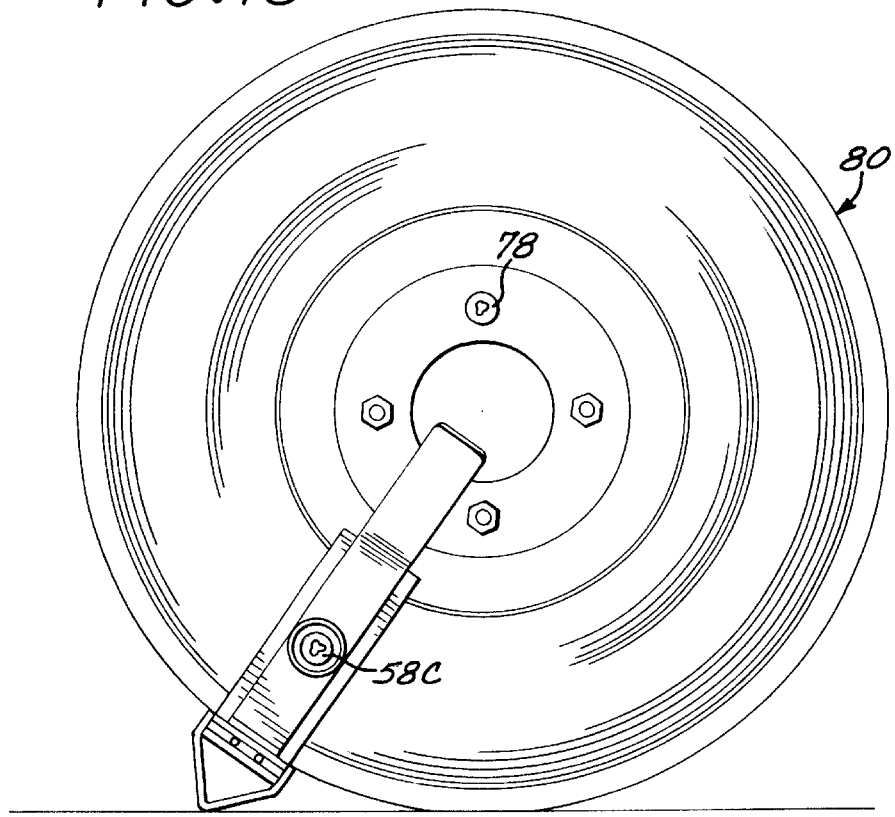
FIG. 15 is a side view of a boat trailer wheel with the locked chock assembly of FIG. 14 in place.

The chock assembly and locking means shown in FIGS. 14 and 15 is primarily for boat trailers and differs from the embodiment of FIG. 1–3 in that it employs a single tire compression element 40C and upstanding arm 20C is curved in such fashion as to insure that an upper rim engaging portion 76 will engage rim lip 70C as opposed to merely overlying the same as is the case with rim abutment member 68C integral with arm 18C.

With reference to FIG. 15 it will be seen that a self locking lug nut 78, having the same line key pattern as lug nut 58C, replaces one of the nuts on trailer wheel 80 to deter theft by substituting a spare tire.

I claim:

1. A method of chocking and locking a vehicle tire, comprising:

providing a generally U-shaped chock assembly having a first L-shaped telescopingly eagageable member and a second L-shaped telescopingly engageable member interconnected by a chock element, a fulcrum operated lever and a lock;

positioning said generally U-shaped chock assembly with a bight portion thereof spanning a tire rolling surface; and, disengagably connecting said lever to one of said L-shaped telescopingly engagable members and forcing said lever against said second L-shaped member to provide a mechanical advantage to the user to move said second L-shaped member against a sidewall of the tire to compress the tire, and connecting said lock to said U-shaped chock assembly and lever to lock said lever and said U-shaped chock assembly to the tire.

2. The method of chocking and locking a vehicle tire as recited in claim 1, further including the steps of providing a rim abutment device attached to said chock assembly and positioning said rim abutment device above a rim lip of a rim.

3. An apparatus for chocking and locking a vehicular wheel having a rim mounted compressible tire with sidewalls extending beyond the lateral confines of the tire rim, said chocking and locking apparatus comprising:

a U-shaped chock assembly with a bight portion thereof for engaging the sidewalls of the compressible tire, said chock assembly having a first L-shaped member and a second L-shaped member, said first L-shaped member having a horizontal leg with multiple fulcra holes, said second L-shaped member having a chock element for telescopic receipt of said horizontal leg of said first L-shaped member, at least one L-shaped member having a tire compression element;

a lever having fulcral engaging means for engaging a selected pair of said multiple fulcra holes and to compress the sidewalls of the compressible tire; and, a lock.

4. The apparatus of claim 3, each L-shaped member having a tire compression element.

5. The apparatus of claim 3, said second L-shaped member having an upstanding member with a threaded stud for receipt in an elongated stud receiving slot in said lever and a lug nut for attachment to said threaded stud to lock said lever to said chocking and locking assembly.

6. The apparatus of claim 3, said apparatus further including a rim abutment element attached to said first L-shaped member and positioned above a rim lip of the rim of the tire when the apparatus is locked to the tire.

7. The apparatus of claim 5, said lug nut including a locking pattern on the outer end thereof to receive a similarly patterned key to tighten or loosen said lug nut and a lug nut housing integral with said lever and surrounding said lug nut substantially to the outer end thereof.

8. The apparatus of claim 3, said fulcra engaging means including hooks connected to said lever.

9. The apparatus of claim 3, said lever having a right angle bend which engages an outside surface an upstanding arm of said second L-shaped member, said right angle bend forcing said second L-shaped member against the sidewall of the tire with increasing force to provide the user with a mechanical advantage.

* * * * *